United States Patent
Okuda et al.

(10) Patent No.: US 10,023,171 B2
(45) Date of Patent: Jul. 17, 2018

(54) POWER TRANSMISSION DEVICE

(71) Applicants: Koichi Okuda, Toyota (JP); Atsushi Tabata, Okazaki (JP); Tooru Matsubara, Toyota (JP); Kenta Kumazaki, Toyota (JP); Yasuhiro Hiasa, Nagoya (JP); Takeshi Kitahata, Toyota (JP); Tatsuya Imamura, Okazaki (JP); Masafumi Yamamoto, Toyota (JP); Keita Imai, Toyota (JP); Keisuke Oomuro, Toyota (JP)

(72) Inventors: Koichi Okuda, Toyota (JP); Atsushi Tabata, Okazaki (JP); Tooru Matsubara, Toyota (JP); Kenta Kumazaki, Toyota (JP); Yasuhiro Hiasa, Nagoya (JP); Takeshi Kitahata, Toyota (JP); Tatsuya Imamura, Okazaki (JP); Masafumi Yamamoto, Toyota (JP); Keita Imai, Toyota (JP); Keisuke Oomuro, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 478 days.

(21) Appl. No.: 14/648,078

(22) PCT Filed: Nov. 30, 2012

(86) PCT No.: PCT/JP2012/081169
§ 371 (c)(1),
(2) Date: May 28, 2015

(87) PCT Pub. No.: WO2014/083699
PCT Pub. Date: Jun. 5, 2014

(65) Prior Publication Data
US 2015/0314769 A1    Nov. 5, 2015

(51) Int. Cl.
*F02N 11/00* (2006.01)
*B60W 20/00* (2016.01)
(Continued)

(52) U.S. Cl.
CPC ........... *B60W 20/00* (2013.01); *F02N 11/003* (2013.01); *F16H 57/0439* (2013.01);
(Continued)

(58) Field of Classification Search
CPC . F16H 57/0439; F16H 61/0028; F02N 11/003
See application file for complete search history.

(56) References Cited

U.S. PATENT DOCUMENTS 5,474,428 A * 12/1995 Kimura .............. F16H 57/0439
                                                      192/48.92
6,093,974 A    7/2000 Tabata et al.
(Continued)

FOREIGN PATENT DOCUMENTS

JP    H11303981 A    11/1999
JP    2001146955 A    5/2001
(Continued)

*Primary Examiner* — Erin D Bishop
(74) *Attorney, Agent, or Firm* — Oliff PLC

(57) ABSTRACT

A power transmission device includes: an engine; a rotary machine; and an oil pump connected to each of a rotary shaft of the engine and a rotary shaft of the rotary machine through a one-way clutch. The power transmission device is configured to allow the rotary machine to rotate at a rotational speed higher than the rotational speed corresponding to a speed of the engine and lower than the rotational speed corresponding to an idling speed of the engine at the time of startup of the engine.

5 Claims, 10 Drawing Sheets

(51) Int. Cl.
*F16H 61/00* (2006.01)
*F16H 61/686* (2006.01)
*F16H 57/04* (2010.01)

(52) U.S. Cl.
CPC ....... *F16H 61/0028* (2013.01); *F16H 61/686* (2013.01); *B60Y 2200/92* (2013.01); *Y10S 903/902* (2013.01); *Y10T 477/26* (2015.01)

(56) References Cited

U.S. PATENT DOCUMENTS

| | | |
|---|---|---|
| 2003/0109970 A1 | 6/2003 | Nakamori et al. |
| 2009/0227417 A1* | 9/2009 | Imamura ................ B60K 6/365 477/5 |

FOREIGN PATENT DOCUMENTS

| | | | |
|---|---|---|---|
| JP | 2002227978 A | 8/2002 |
| JP | 2003-172165 A | 6/2003 |
| JP | 2003-172444 A | 6/2003 |
| JP | 2006316666 A | 11/2006 |
| JP | 2007186154 A | 7/2007 |
| JP | 2011220354 A | 11/2011 |

* cited by examiner

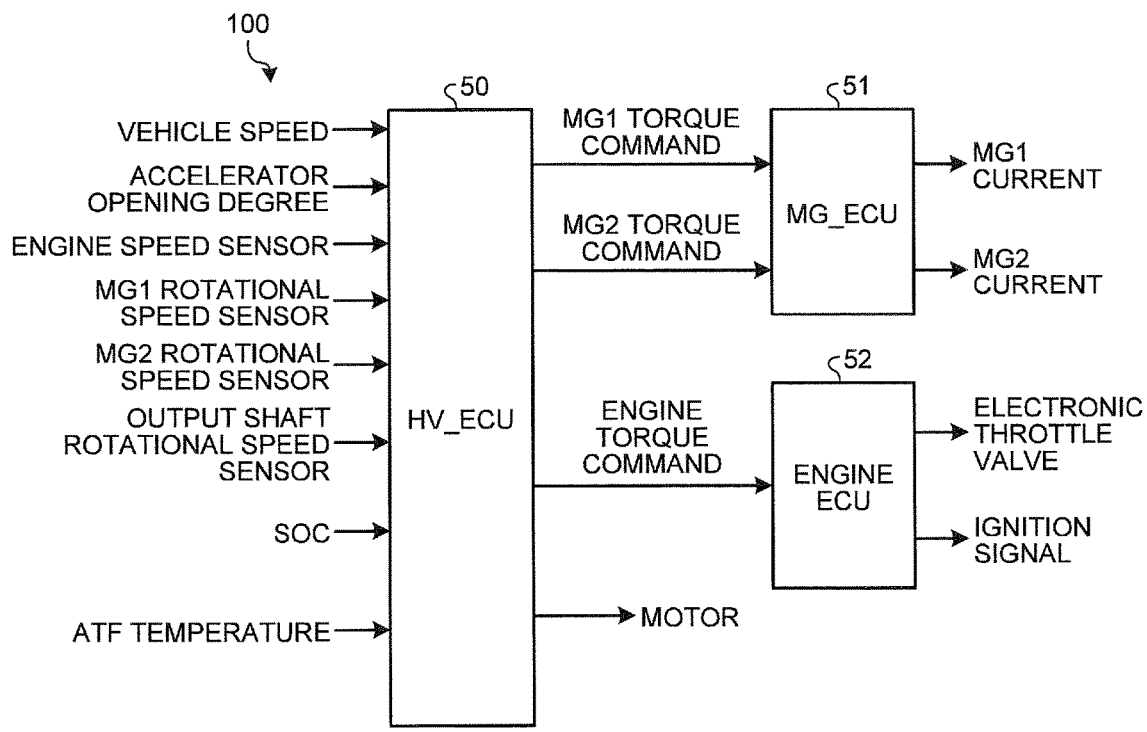

|  |  |  | CL1 | BK1 | MG1 | MG2 |
|---|---|---|---|---|---|---|
| EV | FORWARD MOVEMENT/ REARWARD MOVEMENT | SINGLE DRIVE — DRIVE |  |  | G | M |
|  |  | SINGLE DRIVE — WITH ENGINE BRAKING | △ | △ | G | M |
|  |  | BOTH DRIVE | ○ | ○ | M | M |
| HV | FORWARD MOVEMENT | HIGH |  | ○ | G | M |
|  |  | LOW | ○ |  | G | M |
|  | REARWARD MOVEMENT | LOW | ○ |  | G | M |

○: ENGAGED
G: MAINLY GENERATOR
△: ANY ONE IS ENGAGED WHEN ENGINE BRAKING IS USED TOGETHER
M: MAINLY MOTOR BUT GENERATOR AT THE TIME OF REGENERATION

POWER TRANSMISSION DEVICE

FIELD

The present invention relates to a power transmission device.

BACKGROUND

There conventionally is technology of driving an oil pump by an engine such as an engine and a motor. For example, Patent Literature 1 discloses technology of an oil pump driving device provided with a first power transmission mechanism which connects an output shaft of an electric motor to a drive shaft of the oil pump and a second power transmission mechanism which connects an output shaft of the engine to the drive shaft of the oil pump with a first one-way clutch allowing only power transmission from the electric motor to the oil pump arranged in the first power transmission mechanism and a second one-way clutch allowing only power transmission from the engine to the oil pump arranged in the second power transmission mechanism.

CITATION LIST

Patent Literature

Patent Literature 1: Japanese Laid-open Patent Publication No. 2001-146955

SUMMARY

Technical Problem

Herein, a rotational speed of the oil pump might fluctuate by resonance and the like of the engine at the time of engine startup. It is desirable to inhibit fluctuation in the rotational speed of the oil pump at the time of the engine startup. It is preferable to inhibit power consumption of the motor which drives the oil pump.

An object of the present invention is to provide the power transmission device capable of inhibiting the fluctuation in the rotational speed of the oil pump at the time of the engine startup.

Another object of the present invention is to provide the power transmission device capable of satisfying both inhibiting the fluctuation in the rotational speed of the oil pump at the time of the engine startup and inhibiting the power consumption of the motor which drives the oil pump.

Solution to Problem

A power transmission device according to the present invention includes: an engine; a rotary machine; and an oil pump connected to each of a rotary shaft of the engine and a rotary shaft of the rotary machine through a one-way clutch. The power transmission device is configured to allow the rotary machine to rotate at a rotational speed higher than the rotational speed corresponding to a speed of the engine and lower than the rotational speed corresponding to an idling speed of the engine at the time of startup of the engine.

In the above-described invention, it is preferable that the power transmission device is configured to allow the rotary machine to rotate for a predetermined period from a start of the startup of the engine at the time of the startup of the engine.

In the above-described invention, it is preferable that the rotational speed of the rotary machine when the rotary machine is allowed to rotate at the time of the startup of the engine is higher when the engine is cold than when the engine is hot.

In the above-described invention, it is preferable that the rotational speed of the rotary machine when the rotary machine is allowed to rotate at the time of the startup of the engine is higher than the rotational speed corresponding to the speed of the engine in a resonance generation range.

In the above-described invention, it is preferable that the rotational speed of the rotary machine when the rotary machine is allowed to rotate at the time of the startup of the engine is lower than the rotational speed corresponding to the speed of the engine when ignition of the engine is started.

Advantageous Effects of Invention

The power transmission device according to the present invention is provided with the engine, the rotary machine, and the oil pump connected to each of the rotary shaft of the engine and the rotary shaft of the rotary machine through the one-way clutch and allows the rotary machine to rotate at the rotational speed higher than the rotational speed corresponding to the speed of the engine and lower than the rotational speed corresponding to the idling speed of the engine. The power transmission device according to the present invention has an effect of inhibiting the fluctuation in the rotational speed of the oil pump at the time of the engine startup.

BRIEF DESCRIPTION OF DRAWINGS

FIG. 3 is an input output relationship diagram of the vehicle according to the first embodiment.

FIG. 4 is a view illustrating an engagement table of a transmission unit according to the first embodiment.

DESCRIPTION OF EMBODIMENTS

A power transmission device according to embodiments of the present invention is hereinafter described in detail with reference to the drawings. Meanwhile, the invention is not limited by the embodiments. Components in the following embodiments include a component easily conceived of by one skilled in the art or a substantially identical component.

[First Embodiment]

Figure 1:
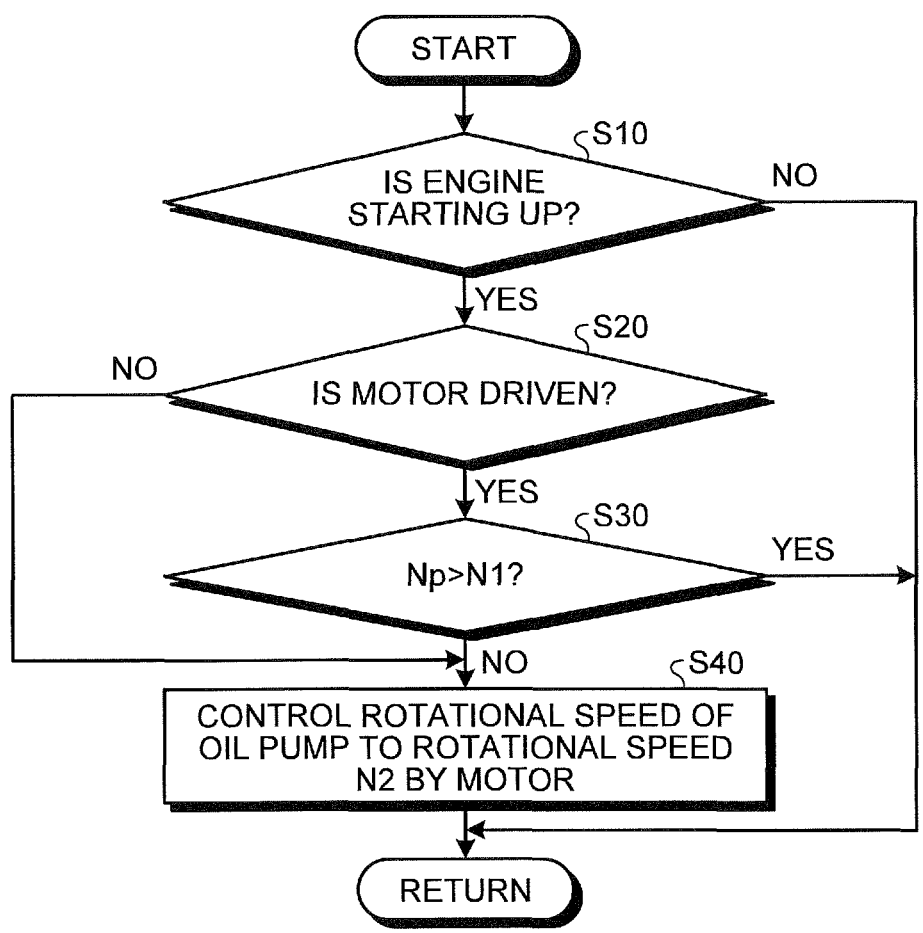
FIG. 1 is a flowchart illustrating operation of a power transmission device according to a first embodiment.

A first embodiment is described with reference to FIGS. 1 to 7. This embodiment relates to a power transmission device. FIG. 1 is a flowchart illustrating operation of the power transmission device according to the first embodiment, FIG. 2 is a skeleton diagram of a vehicle according to the first embodiment, FIG. 3 is an input output relationship diagram of the vehicle according to the first embodiment, and FIG. 4 is a view illustrating an engagement table of a transmission unit according to the first embodiment.

Figure 2:
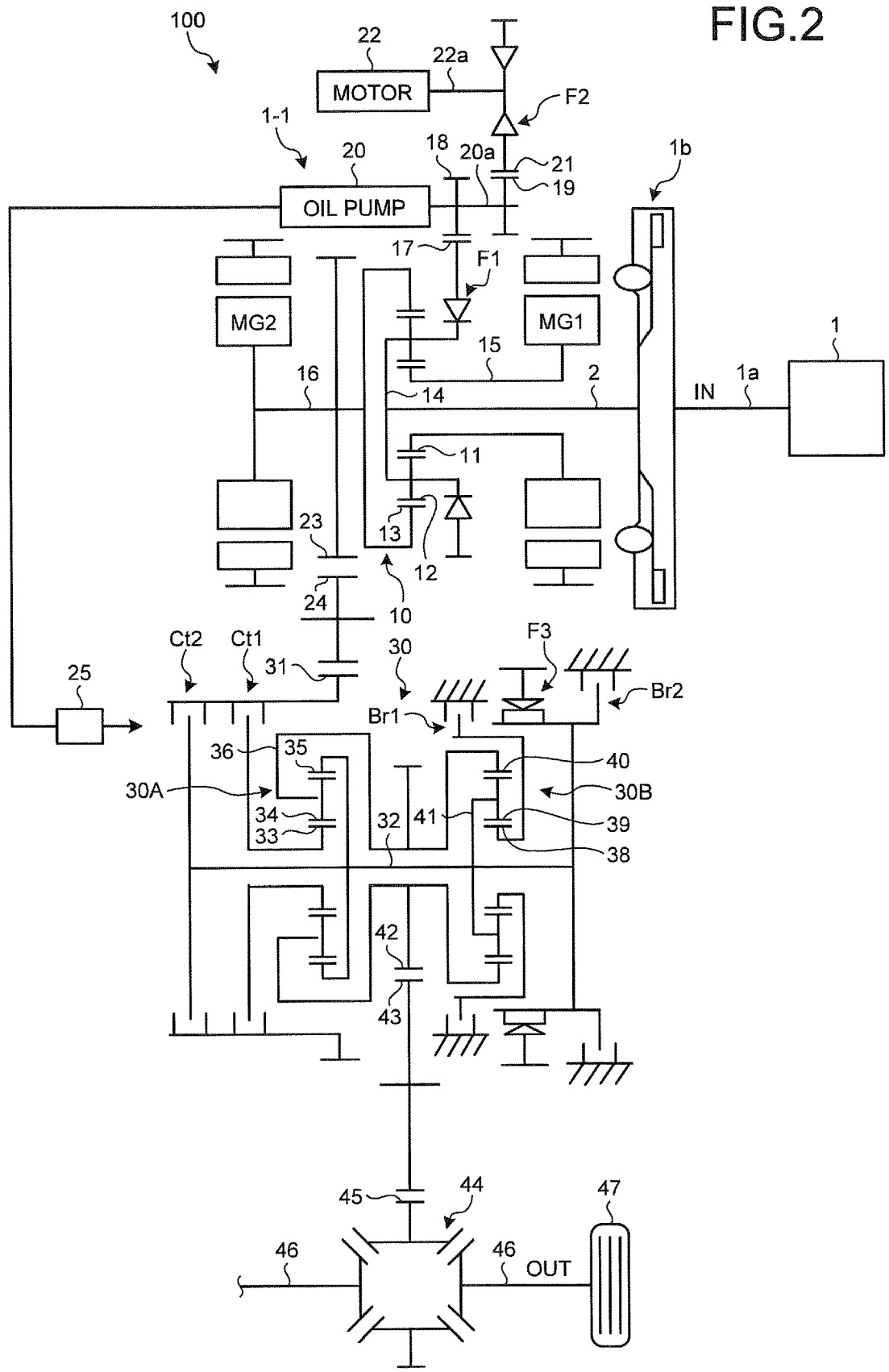
FIG. 2 is a skeleton diagram of a vehicle according to the first embodiment.

As illustrated in FIG. 2, a vehicle 100 according to the embodiment is a hybrid vehicle including an engine 1, a first rotary machine MG1, and a second rotary machine MG2 as power sources. The vehicle 100 may also be a plug-in hybrid vehicle which may be charged by an external power source. As illustrated in FIGS. 2 and 3, the vehicle 100 includes the engine 1, a planetary gear mechanism 10, the first rotary machine MG1, the second rotary machine MG2, an oil pump 20, a pump drive motor 22, a first one-way clutch F1, a second one-way clutch F2, a transmission unit 30, a HV_ECU 50, an MG_ECU 51, and an engine ECU 52.

A power transmission device 1-1 according to this embodiment includes the engine 1, the pump drive motor 22, the oil pump 20, the first one-way clutch F1, and the second one-way clutch F2. The power transmission device 1-1 may further include the HV_ECU 50, the transmission unit 30 and the like. The power transmission device 1-1 is applicable to a front-engine front-wheel drive (FF) vehicle, a rear-engine rear-wheel drive (RR) vehicle or the like. The power transmission device 1-1 is mounted on the vehicle 100 such that an axial direction thereof coincides with a vehicle width direction, for example.

The engine 1 being an engine converts combustion energy of fuel to rotational motion of a rotary shaft 1a to output. The rotary shaft 1a of the engine 1 is connected to an input shaft 2 through a damper 1b. The input shaft 2 is the input shaft of the power transmission device 1-1. The input shaft 2 is arranged coaxially with the rotary-shaft 1a of the engine 1 along its extension. The input shaft 2 is connected to a first carrier 14 of the planetary gear mechanism 10.

The planetary gear mechanism 10 being a differential unit may serve as a power dividing mechanism to divide power of the engine 1. The planetary gear mechanism 10 of the embodiment being a single pinion type includes a first sun gear 11, a first pinion gear 12, a first ring gear 13, and the first carrier 14.

The first ring gear 13 is arranged coaxially with the first sun gear 11 on an outer side of the first sun gear 11 in a radial direction. The first pinion gear 12 is arranged between the first sun gear 11 and the first ring gear 13 to mesh with the first sun gear 11 and the first ring gear 13. The first pinion gear 12 is rotatably supported by the first carrier 14. The first carrier 14 is coupled to the input shaft 2 and integrally rotates with the input shaft 2. Therefore, the first pinion gear 12 may rotate (revolve) around a central axis of the input shaft 2 together with the input shaft 2 and may rotate (rotate) around a central axis of the first pinion gear 12 while being supported by the first carrier 14.

The pump drive motor 22 is a rotary machine provided separately from the first and second rotary machines MG1 and MG2. The oil pump 20 is a pump which is rotary-driven by the engine 1 or the pump drive motor 22 to discharge oil. The oil discharged by the oil pump 20 is supplied to each unit of the power transmission device 1-1 such as clutches Ct1 and Ct2 and brakes Br1 and Br2 of the transmission unit 30. The power transmission device 1-1 includes a hydraulic control device 25. The hydraulic control device 25 adjusts hydraulic pressure of the oil transmitted from the oil pump 20 to supply to the clutches Ct1 and Ct2 and the brakes Br1 and Br2 of the transmission unit 30.

The oil pump 20 is connected to the rotary shaft 1a of the engine 1 and a rotary shaft 22a of the pump drive motor 22 through the one-way clutches F1 and F2, respectively. A rotary shaft 20a of the oil pump 20 includes a first gear 18 and a second gear 19. The first gear 18 meshes with a first drive gear 17. The first drive gear 17 is connected to the first carrier 14 through the first one-way clutch F1. That is to say, the rotary shaft 20a of the oil pump 20 is connected to the rotary shaft 1a of the engine 1 through the first gear 18, the first drive gear 17, the first one-way clutch F1, the first carrier 14, the input shaft 2, and the damper 1b.

The first one-way clutch F1 is the one-way clutch disengaged when a rotational speed of the first drive gear 17 is higher than that of the first carrier 14. That is to say, the first one-way clutch F1 is engaged when the first carrier 14 rotary-drives the first drive gear 17 in a rotational direction of the engine 1 to transmit the power of the engine 1 to the rotary shaft 20a of the oil pump 20.

The second gear 19 meshes with a second drive gear 21. The second drive gear 21 is connected to the rotary shaft 22a of the pump drive motor 22 through the second one-way clutch F2. That is to say, the rotary shaft 20a of the oil pump 20 is connected to the rotary shaft 22a of the pump drive motor 22 through the second gear 19, the second drive gear 21, and the second one-way clutch F2. The second one-way clutch F2 is the one-way clutch disengaged when a rotational speed of the second drive gear 21 is higher than that of the pump drive motor 22. That is to say, the second one-way clutch F2 is engaged when the pump drive motor 22 rotary-drives the second drive gear 21 to transmit power of the pump drive motor 22 to the rotary shaft 20a of the oil pump 20.

The oil pump 20 is rotary-driven by the engine 1 or the pump drive motor 22 according to a relationship among a speed of the engine 1 (engine speed) Ne, a rotational speed of the oil pump 20 (pump rotational speed) Np, and a rotational speed of the pump drive motor 22 (motor rotational speed) Nm. For example, when the motor rotational speed Nm is higher than the rotational speed corresponding to the engine speed Ne, the oil pump 20 is rotary-driven by the pump drive motor 22. Herein, the rotational speed corresponding to the engine speed Ne is the rotational speed determined by a gear ratio between the first drive gear 17 and the first gear 18 and a gear ratio between the second drive gear 21 and the second gear 19. The rotational speed of the pump drive motor 22 corresponding to the engine speed Ne is the motor rotational speed Nm corresponding to the engine speed Ne when the oil pump 20 is rotary-driven at the same pump rotational speed Np. In the power transmission device 1-1 of this embodiment, it is possible to supply the oil to each unit by rotary-driving the oil pump 20 by rotating the pump drive motor 22 also in a travel state in which operation of the engine 1 is stopped.

In contrast, when the motor rotational speed Nm is lower than the rotational speed corresponding to the engine speed Ne, the first one-way clutch F1 is engaged and the second one-way clutch F2 is disengaged. According to this, the oil pump 20 is rotary-driven by the engine 1 (first carrier 14).

The first sun gear 11 is connected to a rotary shaft 15 of the first rotary machine MG1 and integrally rotates with a rotor of the first rotary machine MG1. The first ring gear 13 is connected to a rotary shaft 16 of the second rotary machine MG2 and integrally rotates with rotor of the second rotary machine MG2. An output gear 23 is connected to the rotary shaft 16. The output gear 23 meshes with an intermediate gear 24. An input gear 31 of the transmission unit 30 meshes with the intermediate gear 24.

The transmission unit 30 includes the input gear 31, a rotary shaft 32, a first differential mechanism 30A, a second differential mechanism 30B, the first clutch Ct1, the second clutch Ct2, the first brake Br1, the second brake Br2, a one-way clutch F3, and an output gear 42. The transmission unit 30 is an automatic transmission (4AT) including forward-four-speed gear stages.

The first differential mechanism 30A and the second differential mechanism 30B are arranged coaxially with the rotary shaft 32 to be opposed to each other in an axial direction across the output gear 42. The first differential mechanism 30A and the second differential mechanism 30B are single pinion type planetary gear mechanisms. The first differential mechanism 30A includes a sun gear 33, a pinion gear 34, a ring gear 35, and a carrier 36. The second differential mechanism 30B includes a sun gear 38, a pinion gear 39, a ring gear 40, and a carrier 41. The sun gear 33 of the first differential mechanism 30A is connected to the input gear 31 through the first clutch Ct1, the carrier 36 is connected to the output gear 42, and the ring gear 35 is connected to the rotary shaft 32.

The carrier 41 of the second differential mechanism 30B is connected to the rotary shaft 32, and the ring gear 40 is connected to the output gear 42. The rotary shaft 32 is connected to the input gear 31 through the second clutch Ct2. The first brake Br1 is a brake device which regulates rotation of the sun gear 38 of the second differential mechanism 30B. The second brake Br2 is a brake device which regulates rotation of the rotary shaft 32. The one-way clutch F3 is the one-way clutch which allows the rotation in a positive rotational direction of the rotary shaft 32 and regulates the rotation in a negative rotational direction thereof. Meanwhile, the positive rotational direction is intended to mean the rotational direction of the output gear 42 when the vehicle 100 travels forward.

The output gear 42 of the transmission unit 30 meshes with an intermediate gear 43. The intermediate gear 43 meshes with a differential ring gear 45 of a differential device 44. The differential device 44 is connected to drive wheels 47 through right and left drive shafts 46.

As illustrated in FIG. 4, the first clutch Ct1 is engaged in a first-speed gear stage (first). Since the first clutch Ct1 is engaged, the input gear 31 is connected to the sun gear 33 of the first differential mechanism 30A. The one-way clutch F3 is engaged and the ring gear 35 and the carrier 41 serve as a reaction force receiver. Torque input from the engine 1 to the input gear 31 is transmitted from the sun gear 33 to the output gear 42 through the carrier 36. Meanwhile, the second brake Br2 may be engaged in the first-speed gear stage.

The first clutch Ct1 and the first brake Br1 are engaged in a second-speed gear stage (second). Since the first brake Br1 is engaged, the rotation of the sun gear 38 of the second differential mechanism 30B is regulated. The sun gear 38 serves as the reaction force receiver to transmit the torque input from the input gear 31 to the sun gear 33 of the first differential mechanism 30A to the output gear 42.

The first clutch Ct1 and the second clutch Ct2 are engaged in a third-speed gear stage (third). The sun gear 33 of the first differential mechanism 30A is coupled to the ring gear 35 and differential motion of the first differential mechanism 30A is regulated. The rotation input from the input gear 31 is output from the output gear 42 without speed change.

The second clutch Ct2 and the first brake Br1 are engaged in a fourth-speed gear stage (fourth). Since the first brake Br1 is engaged, the rotation of the sun gear 38 of the second differential mechanism 30B is regulated. The sun gear 38 serves as the reaction force receiver to transmit the torque input from the input gear 31 to the carrier 41 of the second differential mechanism 30B from the ring gear 40 to the output gear 42. A rotational speed of the ring gear 40 becomes higher than that of the carrier 41 and the rotation input from the input gear 31 to the carrier 41 is accelerated to be output from the ring gear 40 to the output gear 42.

In a reverse gear stage (Rev), the first clutch Ct1 and the second brake Br2 are engaged. In the reverse gear stage, the second rotary machine MG2 outputs negative torque to negatively rotate, thereby allowing the vehicle 100 to move rearward. In neutral (N), all the clutches Ct1 and Ct2 and brakes Br1 and Br2 are disengaged.

Each of the first and second rotary machines MG1 and MG2 has a function as a motor (electric motor) and a function as a power generator. The first and second rotary machines MG1 and MG2 are connected to a battery through an inverter. The first and second rotary machines MG1 and MG2 may convert electric power supplied from the battery to mechanical power to output and may be driven by input power to convert the mechanical power to the electric power. The electric power generated by the rotary machines MG1 and MG2 may be stored in the battery. An AC synchronous motor generator may be used, for example, as the first and second rotary machines MG1 and MG2.

As illustrated in FIG. 3, the vehicle 100 includes the HV_ECU 50, the MG_ECU 51, and the engine ECU 52. The ECUs 50, 51, and 52 are electronic control units having a computer. The HV_ECU 50 has a function to integrally control an entire vehicle 100. The MG_ECU 51 and the engine ECU 52 are electrically connected to the HV_ECU 50.

The MG_ECU 51 may control the first and second rotary machines MG1 and MG2. The MG_ECU 51 may adjust a current value supplied to the first rotary machine MG1 and a power generation amount of the first rotary machine MG1, thereby controlling output torque of the first rotary machine MG1, and may adjust a current value supplied to the second rotary machine MG2 and a power generation amount of the second rotary machine MG2, thereby controlling output torque of the second rotary machine MG2, for example.

The engine ECU 52 may control the engine 1. The engine ECU 52 may control an opening degree of an electronic throttle valve of the engine 1, control ignition of the engine 1 by outputting an ignition signal, and control injection of the fuel to the engine 1, for example. The engine ECU 52 may control output torque of the engine 1 by the opening degree control of the electronic throttle valve, the injection control, the ignition control and the like.

A vehicle speed sensor, an accelerator opening degree sensor, an engine speed sensor, an MG1 rotational speed sensor, an MG2 rotational speed sensor, an output shaft rotational speed sensor and the like are connected to the HV_ECU 50. The HV_ECU 50 may obtain a vehicle speed, an accelerator opening degree, the engine speed Ne, a rotational speed of the first rotary machine MG1 (hereinafter, also simply referred to as "MG1 rotational speed"), a rotational speed of the second rotary machine MG2 (hereinafter, also simply referred to as "MG2 rotational speed"), an output shaft rotational speed of the power transmission device 1-1 and the like by signals input from the sensors. In addition to the signals, a signal indicating a battery state SOC, a signal indicating ATF temperature and the like are input to the HV_ECU 50. Meanwhile, the ATF temperature is temperature of the oil supplied by the oil pump 20.

The HV_ECU 50 may calculate required driving force, required power, required torque and the like of the vehicle 100 based on obtained information. The HV_ECU 50 determines the output torque of the first rotary machine MG1 (hereinafter, also referred to as "MG1 torque"), the output torque of the second rotary machine MG2 (hereinafter, also referred to as "MG2 torque"), and the output torque of the engine 1 (hereinafter, also referred to as "engine torque") based on the calculated required values. The HV_ECU 50 outputs a command value of the MG1 torque and a command value of the MG2 torque to the MG_ECU 51. The HV_ECU 50 outputs a command value of the engine torque to the engine ECU 52. The HV_ECU 50 outputs a command value of the rotational speed of the pump drive motor 22 to a drive circuit of the pump drive motor 22. According to this, the pump drive motor 22 is feed-back controlled so as to rotate at a target rotational speed.

The vehicle 100 may selectively execute hybrid (HV) travel or EV travel. The HV travel is a travel mode in which the vehicle 100 travels by using the engine 1 as the power source. In the HV travel, the second rotary machine MG2 may be used as the power source in addition to the engine 1.

Figure 5:
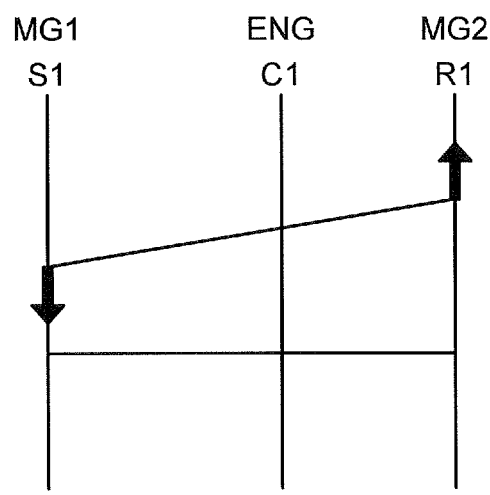
FIG. 5 is an alignment chart of a planetary gear mechanism according to the first embodiment.

FIG. 5 is an alignment chart of the planetary gear mechanism 10 according to the first embodiment. FIG. 5 illustrates the alignment chart at the time of the HV travel. In the alignment chart, rotational speeds of the first sun gear 11, the first carrier 14, and the first ring gear 13 are plotted along axes S1, C1, and R1, respectively. The torque input from the engine 1 to the first carrier 14 is distributed to the first sun gear 11 and the first ring gear 13. The first rotary machine MG1 outputs the MG1 torque to serve as the reaction force receiver of the engine torque and may output the engine torque from the first ring gear 13. At that time, the first rotary machine MG1 may generate electric power and recover a part of the engine torque as electric energy. The HV_ECU 50 may control the MG1 rotational speed to adjust a gear ratio of the planetary gear mechanism 10 to an arbitrary gear ratio. The HV_ECU 50 may allow the planetary gear mechanism 10 and the transmission unit 30 to serve as an electric continuously variable transmission by cooperative control thereof. At the time of the HV travel, the second rotary machine MG2 may execute regeneration.

The EV travel is a travel mode to travel by using the second rotary machine MG2 as the power source. In the EV travel, it is possible to travel with the engine 1 stopped. In the EV travel, the engine 1 is not dragged and the first carrier 14 stops rotating. The first sun gear 11 and the first rotary machine MG1 negatively rotate.

The oil pump 20 is rotary-driven by the rotation of the engine 1 to supply the oil to each unit at the time of the HV travel. In contrast, the oil pump 20 is rotary-driven by the pump drive motor 22 to supply the oil to each unit at the time of the EV travel in which the engine 1 stops. The HV_ECU 50 operates the pump drive motor 22 to rotary-drive the oil pump 20 in the EV travel mode.

(Engine Startup)

In the vehicle 100 of this embodiment, it is possible to start up the engine 1 by increasing the engine speed Ne by the MG1 torque, for example. When the engine speed Ne increases, fuel supply and ignition of the engine 1 are performed and startup of the engine 1 is completed. The engine 1 may also start up by cranking by a starter.

Herein, the hydraulic pressure might fluctuate when the engine 1 starts up such as when it shifts from the EV travel mode to the HV travel mode or when the vehicle starts moving. There is a resonance generation range of the engine speed. The resonance generation range is a speed range in which resonance occurs of the engine 1, the range inherent to each engine. If the engine speed Ne is in the resonance generation range when the engine 1 starts up, the engine speed Ne might fluctuate up and down. When the engine speed Ne fluctuates while the engine 1 rotary-drives the oil pump 20, there is possibility that the rotational speed of the oil pump 20 fluctuates and hydraulic pressure pulsation occurs to affect control of the clutches Ct1 and Ct2 and the brakes Br1 and Br2.

The power transmission device 1-1 of this embodiment rotates the pump drive motor 22 at the rotational speed higher than the rotational speed corresponding to the engine speed Ne and lower than the rotational speed corresponding to an idling speed of the engine 1 when the engine 1 starts up. In other words, the power transmission device 1-1 rotates the pump drive motor 22 at the rotational speed lower than the rotational speed corresponding to the idling speed of the engine 1 to drive the oil pump 20 by the pump drive motor 22 when the engine 1 starts up. According to this, an effect of inhibiting the fluctuation in the pump rotational speed Np and the fluctuation in supply hydraulic pressure of the oil pump 20 is expected. Therefore, the power transmission device 1-1 according to this embodiment may improve controllability of the transmission unit 30 when the engine starts up. For example, occurrence of gear shift shock by the fluctuation in the hydraulic pressure is inhibited and drivability is improved.

Figure 6:
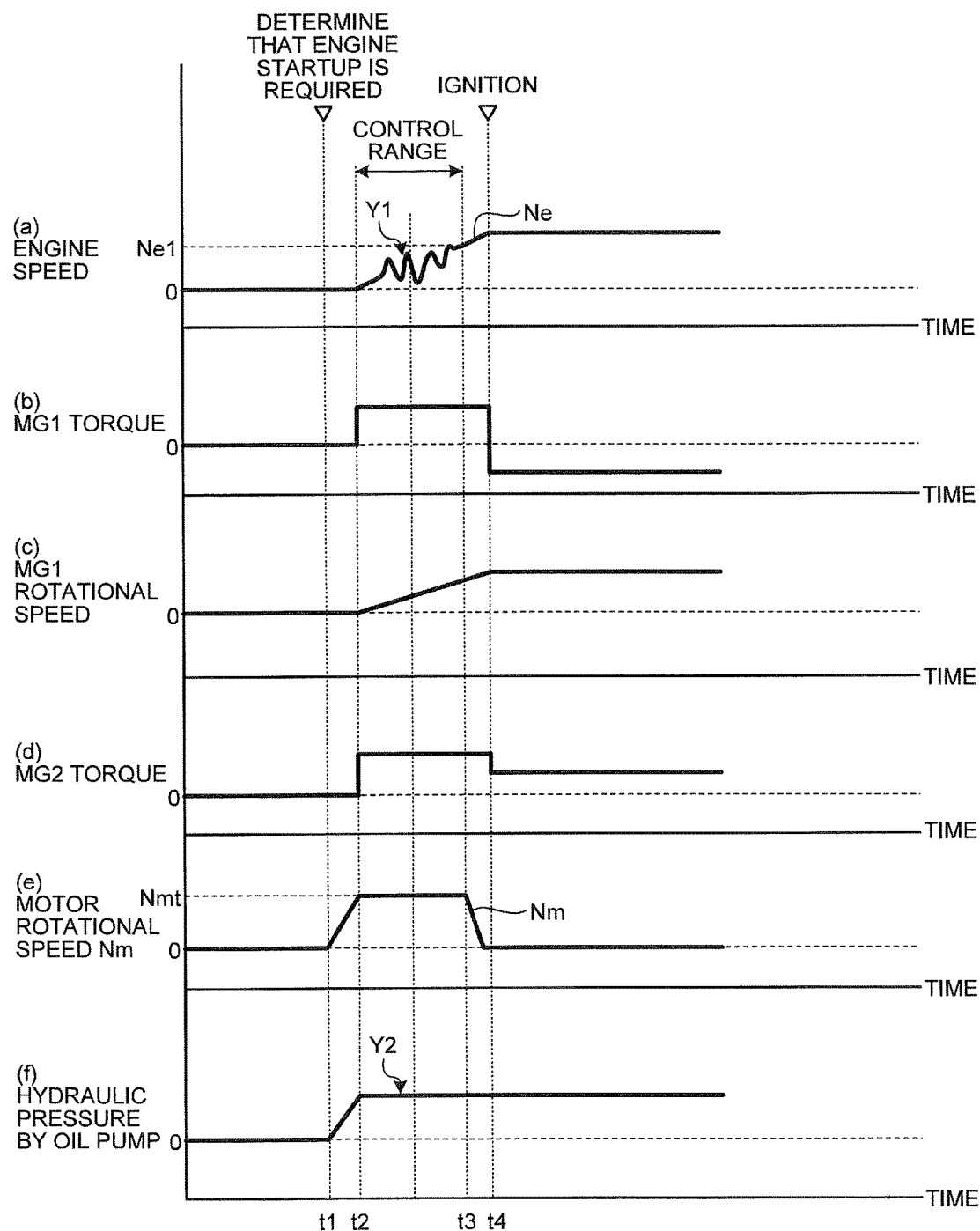
FIG. 6 is a time chart regarding pump control of the first embodiment.

Control of the oil pump 20 of this embodiment is described with reference to FIGS. 1, 6, and 7. FIG. 6 is a time chart regarding the pump control of the first embodiment. In FIG. 6, (a) illustrates the engine speed Ne, (b) illustrates the MG1 torque, (c) illustrates the MG1 rotational speed, (d) illustrates the MG2 torque, (e) illustrates the motor rotational speed Nm, and (f) illustrates the hydraulic pressure supplied by the oil pump 20. A control flow illustrated in FIG. 1 is repeatedly executed at a predetermined interval, for example.

First, at step S10, the HV_ECU 50 determines whether the engine is starting up. In FIG. 6, it is determined that the engine startup is required at time t1 and engine startup control and the control of the oil pump 20 are started. It is positively determined at step S10 after time t1. As a result of the determination at step S10, when it is determined that the engine is starting up (step S10-Y), the procedure shifts to step S20, and otherwise (step S10-N), this control flow is finished.

At step S20, the HV_ECU 50 determines whether the motor is driven. At step S20, it is determined whether the pump drive motor 22 is rotary-driven. When it is negatively determined at step S20, the oil pump 20 is not in a rotary-driven state or is in a state rotary-driven by the torque input from the engine 1. As a result of the determination at step S20, when it is determined that the motor is driven (step S20-Y), the procedure shifts to step S30, and otherwise (step S20-N), the procedure shifts to step S40. In FIG. 6, the pump drive motor 22 is not operated at time t1 at which it is determined that the engine startup is required, so that it is negatively determined at step S20.

At step S30, the HV_ECU 50 determines whether the pump rotational speed Np is higher than a threshold N1. At step S30, it is determined whether the pump drive motor 22 rotates the oil pump 20. The threshold N1 may be set to the pump rotational speed Np higher than the pump rotational speed Np corresponding to the speed in the resonance generation range of the engine 1, for example. Herein, the pump rotational speed Np corresponding to the engine speed Ne is the pump rotational speed Np determined according to the gear ratio between the first drive gear 17 and the first gear 18. That is to say, the pump rotational speed Np corresponding to the engine speed Ne is the pump rotational speed Np when the oil pump 20 is driven by the engine 1 at a certain engine speed Ne.

Meanwhile, the threshold N1 may be set to the pump rotational speed Np corresponding to a current engine speed Ne or the pump rotational speed Np corresponding to the rotational speed higher than the current engine speed Ne by a predetermined rotational speed, for example. That is to say, the threshold N1 may be set to the rotational speed with which it may be determined that the pump drive motor 22 rotary-drives the oil pump 20. As a result of the determination at step S30, when it is determined that the pump rotational speed Np is higher than the threshold N1 (step S30-Y), this control flow is finished, and otherwise (step S30-N), the procedure shifts to step S40.

At step S40, the HV_ECU 50 executes control of the pump rotational speed Np by the pump drive motor 22. The HV_ECU 50 controls the motor rotational speed Nm such that the pump rotational speed Np is set to a predetermined rotational speed N2. A target value of the motor rotational speed Nm (target motor rotational speed) Nmt at that time is the rotational speed lower than the rotational speed corresponding to the idling speed of the engine 1.

Figure 7:
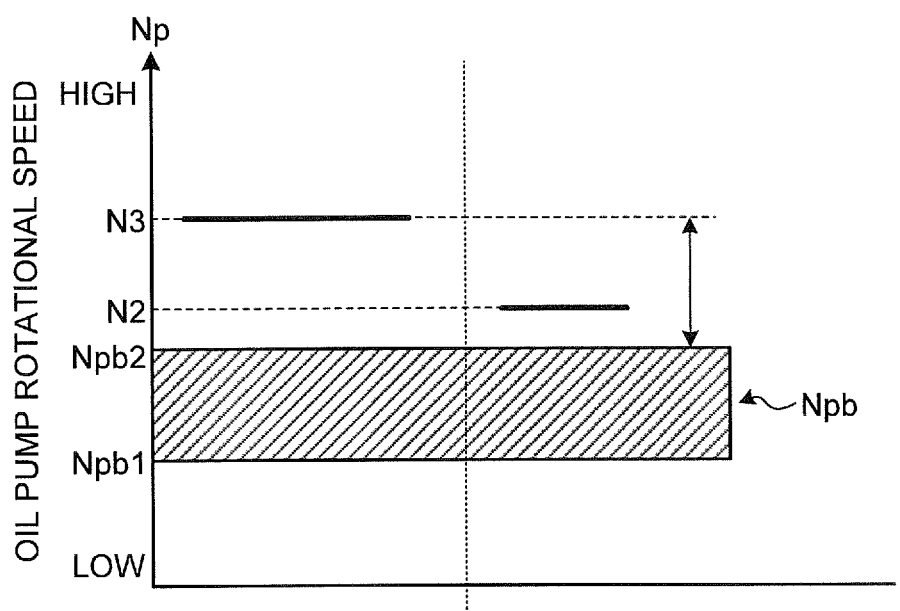
FIG. 7 is an illustration diagram of a method of calculating a target motor rotational speed of the first embodiment.

FIG. 7 is an illustration diagram of a method of calculating the target motor rotational speed Nmt of the first embodiment. In FIG. 7, the pump rotational speed Np is plotted along a vertical axis. Reference sign Npb represents a range of the pump rotational speed corresponding to the resonance generation range of the engine 1 (hereinafter, referred to as "resonance rotational speed range"). A lowest rotational speed Npb1 of the resonance rotational speed range Npb is the pump rotational speed Np corresponding to a lowest speed of the resonance generation range of the engine 1. A highest rotational speed Npb2 of the resonance rotational speed range Npb is the pump rotational speed Np corresponding to a highest speed of the resonance generation range of the engine 1.

The predetermined rotational speed N2 being a target value of the pump rotational speed Np at the time of the engine startup is higher than the highest rotational speed Npb2 of the resonance rotational speed range Npb. The predetermined rotational speed N2 is lower than an idle time pump rotational speed N3. The idle time pump rotational speed N3 is the pump rotational speed Np when the oil pump 20 is rotary-driven by the engine 1 when the engine 1 runs idle, that is to say, the pump rotational speed Np corresponding to the idling speed of the engine 1. Meanwhile, the idle time pump rotational speed N3 may be the rotational speed corresponding to the idling speed of the engine 1 during cold time or the rotational speed corresponding to the idling speed of the engine 1 during warm time. That is to say, the idle time pump rotational speed N3 may be a value varying according to cooling water temperature and the like of the engine 1.

The target motor rotational speed Nmt is a value capable of rotating the oil pump 20 at the predetermined rotational speed N2. That is to say, the target motor rotational speed Nmt is higher than the rotational speed corresponding to the speed of the resonance generation range of the engine 1 and lower than the rotational speed corresponding to the idling speed of the engine 1. The predetermined rotational speed N2 may be set to the rotational speed half the idle time pump rotational speed N3, for example. Alternatively, the predetermined rotational speed N2 may be set to the rotational speed corresponding to the engine speed Ne at which the ignition of the engine 1 is started at the time of the engine startup, for example. It is possible to avoid excessive power consumption by shifting from a motor driven state to an engine driven state at the pump rotational speed Np lower than the idle time pump rotational speed N3.

In FIG. 6, the operation of the pump drive motor 22 is started and the motor rotational speed Nm starts increasing at time t1. The motor rotational speed Nm increases up to the target motor rotational speed Nmt at time t2, and thereafter the motor rotational speed Nm is maintained at the target motor rotational speed Nmt. The HV_ECU 50 instructs the MG_ECU 51 and the engine ECU 52 to start up the engine at time t2. The MG_ECU 51 allows the first rotary machine MG1 to output positive torque to increase the MG1 rotational speed. According to this, the engine speed Ne increases. The engine speed Ne oscillates up and down in the resonance generation range (refer to arrow Y1). However, the oil pump 20 is rotary-driven by the pump drive motor 22 at that time, and the motor rotational speed Nm is higher than the rotational speed corresponding to the engine speed Ne. Therefore, even if the resonance occurs in the engine 1, the fluctuation in the pump rotational speed Np is inhibited. Therefore, the hydraulic pressure by the oil pump 20 remains stable as indicated by arrow Y2.

When the pump drive motor 22 executes the control of the pump rotational speed Np at step S40, this control flow is finished.

When the engine speed Ne increases at the time of the engine startup, a drive source of the oil pump 20 switches from the pump drive motor 22 to the engine 1. When the engine speed Ne becomes higher than the speed corresponding to the predetermined rotational speed N2, the first one-way clutch F1 is engaged and the second one-way clutch F2 is disengaged. According to this, the oil pump 20 is switched from a state of being rotary-driven by the torque transmitted from the pump drive motor 22 (motor driven state) to a state of being rotary-driven by the torque transmitted from the engine 1 (engine driven state). After the oil pump 20 switches from the motor driven state to the engine driven state, the pump drive motor 22 is stopped.

The HV_ECU 50 determines to stop the rotation of the pump drive motor 22 at time t3. The HV_ECU 50 determines to stop the pump drive motor 22 based on the engine speed Ne, for example. At time t3, the engine speed Ne gets out of the resonance generation range and is higher than the speed in the resonance generation range. An engine speed Net at time t3 is higher than the engine speed Ne corresponding to the target motor rotational speed Nmt and the predetermined rotational speed N2 of the oil pump 20. Therefore, the oil pump 20 shifts to the engine driven state of being rotary-driven by the torque input from the engine 1 before time t3. The pump drive motor 22 stops rotating by a stop command from the HV_ECU 50.

In this embodiment, the engine speed (hereinafter, also referred to as "finishing speed") Ne1 when the rotation of the pump drive motor 22 is stopped (time t3) is lower than the engine speed Ne at which the ignition of the engine 1 is started. That is to say, the target motor rotational speed Nmt of this embodiment is set to be lower than the rotational speed corresponding to the engine speed Ne at which the ignition of the engine 1 is started. According to this, the motor rotational speed Nm when the pump drive motor 22 is rotated at the time of the engine 1 startup becomes lower than the rotational speed corresponding to the engine speed Ne at which the ignition of the engine 1 is started. Therefore, power consumption of the pump drive motor 22 is reduced.

In this embodiment, a control range starts at time t2 at which the speed of the engine 1 starts increasing and ends at time t3. The control range is a period in which the motor rotational speed Nm is set to the target motor rotational speed Nmt. In this embodiment, when the engine speed Ne increases up to the finishing speed Ne1, the control range ends. The finishing speed Ne1 is the engine speed Ne corresponding to the predetermined rotational speed N2 of the oil pump 20 and the engine speed Ne corresponding to the target motor rotational speed Nmt of the pump drive motor 22, for example.

The HV_ECU 50 rotates the pump drive motor 22 for a predetermined period from a start of the engine 1 startup when the engine 1 starts up. In this embodiment, a period from the start of the operation of the pump drive motor 22 until at least it switches to the engine driven state is the predetermined period, that is to say, a "period in which the pump drive motor 22 is rotated at the rotational speed higher than the rotational speed corresponding to the engine speed Ne and lower than the rotational speed corresponding to the idling speed of the engine 1 at the time of the engine startup". Meanwhile, the predetermined period may start when the speed Ne of the stopped engine starts increasing (time t2 in FIG. 6). In other words, the "engine 1 startup" may be started at the time at which the engine startup is determined to be required or at the time at which the engine speed Ne starts increasing.

Meanwhile, the predetermined period is not limited to the range based on the engine speed Ne. For example, a period from the start of the engine startup until predetermined time elapses may be made the predetermined period. The predetermined time may be a fixed period of approximately one second or may be made variable based on the cooling water temperature and the like at the time of the engine startup, for example. The predetermined time when the cooling water temperature is low is preferably longer than that when the cooling water temperature is high.

The HV_ECU 50 starts the ignition of the engine 1 at time t4 to complete the engine startup. When the engine startup is completed, the HV_ECU 50 shifts the travel made from the EV travel to the HV travel. The HV_ECU 50 allows the vehicle 100 to travel by the MG2 torque while the engine 1 is starting up. When the engine speed Ne is increased by the MG1 torque, negative torque corresponding to reaction force is output from the first ring gear 13. The HV_ECU 50 allows the second rotary machine MG2 to output torque to cancel the reaction torque. When the engine startup is completed, the HV_ECU 50 changes the MG1 torque from the positive torque to the negative torque and allows the first rotary machine MG1 to serve as the reaction force receiver of the engine torque. According to this, the vehicle 100 shifts from the EV travel mode in which the second rotary machine MG2 is used as the power source to the HV travel mode in which this travels by using the engine 1 and the second rotary machine MG2 as the power sources.

According to the power transmission device 1-1 of this embodiment, hydraulic pressure drop and the like when it shifts from the motor driven state to the engine driven state is inhibited. For example, if the predetermined rotational speed N2 is set to be higher than the idle time pump rotational speed N3, when the pump drive motor 22 is stopped when it shifts from the motor driven state to the engine driven state, the pump rotational speed Np might be decreased to cause the hydraulic pressure drop. In contrast, in the power transmission device 1-1 of this embodiment, the predetermined rotational speed N2 is lower than the idle time pump rotational speed N3. Therefore, when the engine speed Ne increases at the time of the engine startup, it automatically and smoothly shifts from the motor driven state to the engine driven state and the hydraulic pressure drop is inhibited.

As described above, the power transmission device 1-1 of this embodiment may inhibit the fluctuation in the rotational speed of the oil pump 20 at the time of the engine startup. Since the target motor rotational speed Nmt is lower than the rotational speed corresponding to the idling speed of the engine 1, the power consumption of the pump drive motor 22 may be inhibited.

Since the fluctuation in the rotational speed of the oil pump 20 is inhibited, controllability of gear shift control of the transmission unit 30 is improved. In the vehicle 100 which may travel by the torque of the second rotary machine MG2, gears of the transmission unit 30 might be shifted during the engine 1 startup. The power transmission device 1-1 according to this embodiment may improve the controllability of the transmission unit 30 when the gears are shifted during the engine startup.

Meanwhile, the engine 1 may be the engine which may autonomously start. For example, when the engine 1 is a direct-injection engine capable of directly injecting the fuel in a cylinder, it is possible to increase the speed of the engine 1 by the combustion energy of the fuel to complete the startup.

[Second Embodiment]

Figure 8:
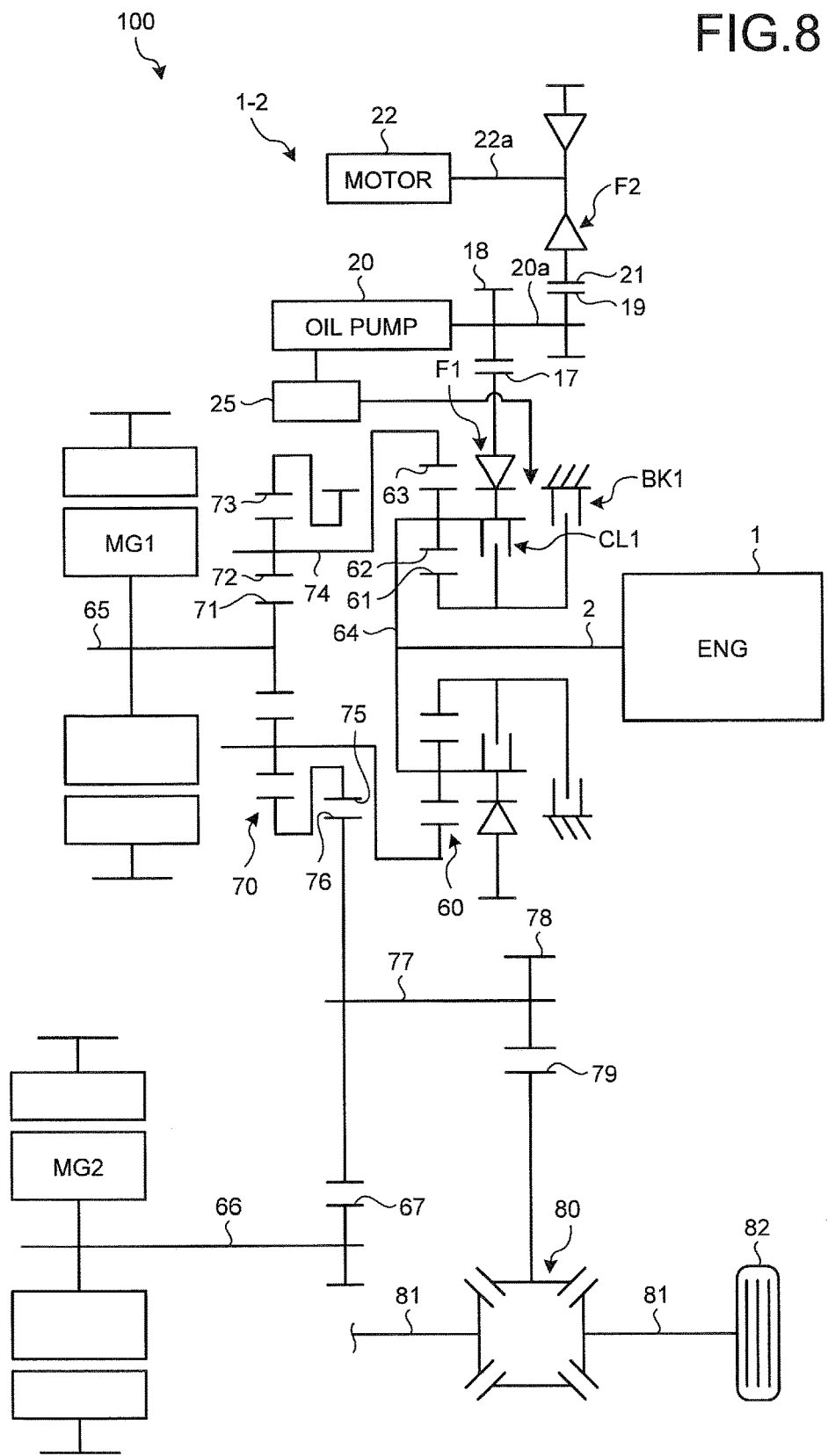
FIG. 8 is a skeleton diagram of a vehicle according to a second embodiment.
Figures 9, 10:
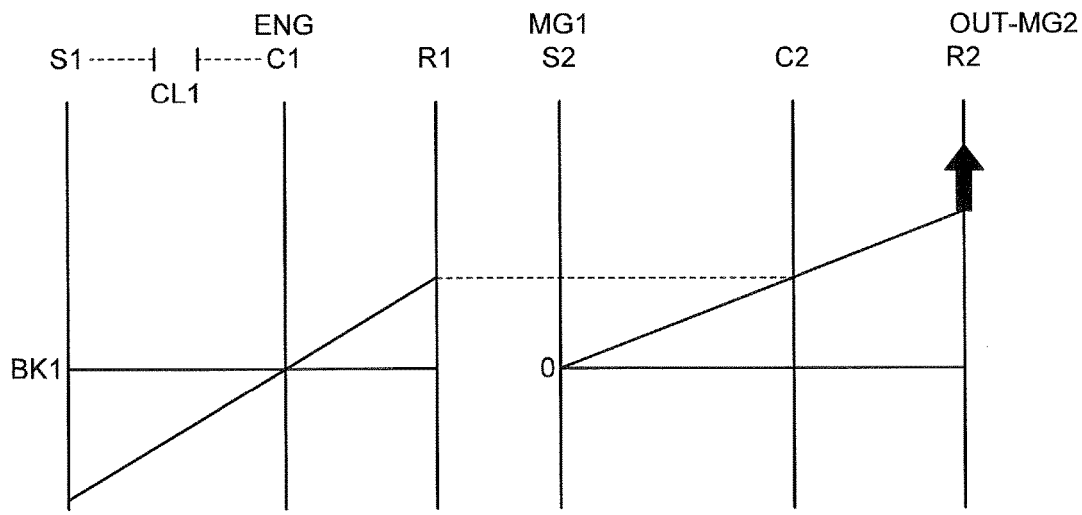
FIG. 9 is a view illustrating an engagement table of a transmission unit according to the second embodiment.
FIG. 10 is an alignment chart regarding a single motor EV mode.

A second embodiment is described with reference to FIGS. 8 to 13. In the second embodiment, the same reference sign is assigned to a component having a function similar to that described in the above-described first embodiment and overlapping description is omitted or simplified. A power transmission device 1-2 according to the second embodiment is different from the power transmission device 1-1 of the above-described first embodiment in a power train configuration. FIG. 8 is a skeleton diagram of a vehicle according to the second embodiment and FIG. 9 is a view illustrating an engagement table of a transmission unit according to the second embodiment.

A vehicle 100 according to this embodiment is a hybrid vehicle including an engine 1, a first rotary machine MG1, and a second rotary machine MG2 as power sources. The vehicle 100 may also be a plug-in hybrid vehicle which may be charged by an external power source. The vehicle 100 includes the engine 1, a first planetary gear mechanism 60, a second planetary gear mechanism 70, the first rotary machine MG1, the second rotary machine MG2, a clutch CL1, and a brake BK1. The vehicle 100 also includes ECUs 50, 51, and 52 as in the above-described first embodiment (refer to FIG. 3).

In the vehicle 100 according to this embodiment, a transmission unit includes the first planetary gear mechanism 60 and a differential unit includes the second planetary gear mechanism 70. The power transmission device 1-2 according to this embodiment includes the engine 1, a pump drive motor 22, an oil pump 20, a first one-way clutch F1, and a second one-way clutch F2.

A rotary shaft of the engine 1 is connected to an input shaft 2. The input shaft 2 is connected to a first carrier 64 of the first planetary gear mechanism 60. The first planetary gear mechanism 60 being a single pinion type as the planetary gear mechanism 10 of the above-described first embodiment includes a first sun gear 61, a first pinion gear 62, a first ring gear 63, and the first carrier 64.

The clutch CL1 is a clutch device capable of coupling the first sun gear 61 to the first carrier 64. The clutch CL1 may be a frictional engaging clutch, for example, but the clutch is not limited to this and a clutch device such as a meshing clutch may also be used as the clutch CL1. The clutch CL1 is driven by hydraulic pressure to be engaged or disengaged, for example. The clutch CL1 in a fully-engaged state may couple the first sun gear 61 to the first carrier 64 to integrally rotate the first sun gear 61 with the first carrier 64. The clutch CL1 in the fully-engaged state regulates differential motion of the first planetary gear mechanism 60. In contrast, the clutch CL1 in a disengaged state disconnects the first sun gear 61 from the first carrier 64 to allow relative rotation between the first sun gear 61 and the first carrier 64. That is to say, the clutch CL1 in the disengaged state allows the differential motion of the first planetary gear mechanism 60. Meanwhile, the clutch CL1 may be controlled to be in a semi-engaged state.

The brake BK1 is a brake device which may regulate the rotation of the first sun gear 61. The brake BK1 includes an engagement element connected to the first sun gear 61 and an engagement element connected to a vehicle body, for example, a case of the power transmission device 1-2. The brake BK1 may be a frictional engaging clutch device as the clutch CL1, but the brake is not limited to this and a clutch device such as a meshing clutch may be used as the brake BK1. The brake BK1 is driven by the hydraulic pressure to be engaged or disengaged, for example. The brake BK1 in a fully-engaged state may couple the first sun gear 61 to the vehicle body to regulate the rotation of the first sun gear 61. In contrast, the brake BK1 in a disengaged state may disconnect the first sun gear 61 from the vehicle body to allow the rotation of the first sun gear 61. Meanwhile, the brake BK1 may be controlled to be in a semi-engaged state.

The second planetary gear mechanism 70 being a single pinion type as the first planetary gear mechanism 60 includes a second sun gear 71, a second pinion gear 72, a second ring gear 73, and a second carrier 74. The second planetary gear mechanism 70 is arranged coaxially with the first planetary gear mechanism 60 to be opposed to the engine 1 across the first planetary gear mechanism 60. The second carrier 74 is a first rotary element connected to the first ring gear 63 being an output element of the first planetary gear mechanism 60.

A rotary shaft 65 of the first rotary machine MG1 is connected to the second sun gear 71. The rotary shaft 65 of the first rotary machine MG1 is arranged coaxially with the input shaft 2 and integrally rotates with the second sun gear 71. The second sun gear 71 is a second rotary element connected to the first rotary machine MG1. A counter drive gear 75 is connected to the second ring gear 73. The counter drive gear 75 is an output gear which integrally rotates with the second ring gear 73. The second ring gear 73 corresponds to a third rotary element connected to the second rotary machine MG2 and a drive wheel 82. The second ring gear 73 is an output element capable of outputting rotation input from the first rotary machine MG1 or the first planetary gear mechanism 60 to the drive wheel 82.

The counter drive gear 75 meshes with a counter driven gear 76. The counter driven gear 76 is connected to a drive pinion gear 78 through a counter shaft 77. The counter driven gear 76 and the drive pinion gear 78 integrally rotate with each other. A reduction gear 67 meshes with the counter driven gear 76. The reduction gear 67 is connected to a rotary shaft 66 of the second rotary machine MG2. That is to say, rotation of the second rotary machine MG2 is transmitted to the counter driven gear 76 through the reduction gear 67. The reduction gear 67 having a smaller diameter than that of the counter driven gear 76 decelerates the rotation of the second rotary machine MG2 to transmit to the counter driven gear 76.

The drive pinion gear 78 meshes with a differential ring gear 79 of a differential device 80. The differential device 80 is connected to the drive wheels 82 through right and left drive shafts 81. The second ring gear 73 is connected to the drive wheel 82 through the counter drive gear 75, the counter driven gear 76, the drive pinion gear 78, the differential device 80, and the drive shaft 81. The second rotary machine MG2 is connected to a power transmission path between the second ring gear 73 and the drive wheel 82 and may transmit power to the second ring gear 73 and the drive wheel 82.

The HV_ECU 50 controls the clutch CL1 and the brake BK1 based on a travel mode and the like to be described later. The HV_ECU 50 outputs a command value of supplied hydraulic pressure (engagement hydraulic pressure) to the clutch CL1 and a command value of supplied hydraulic pressure (engagement hydraulic pressure) to the brake BK1. A hydraulic control device 25 controls the supplied hydraulic pressure to the clutch CL1 and the brake BK1 according to each command value.

As illustrated in FIG. 9, the vehicle 100 has a single motor (single drive) EV mode in which the vehicle 100 travels by using the second rotary machine MG2 as a single power source and a both motor (both drive) EV mode in which the vehicle 100 travels by using the first and second rotary machines MG1 and MG2 as the power sources as the EV travel mode. In FIG. 9, a triangle mark indicates that any one of the clutch CL1 and the brake BK1 is engaged and the other one is disengaged.

The single motor EV mode is executed after disengaging both the clutch CL1 and the brake BK1, for example. FIG. 10 is an alignment chart regarding the single motor EV mode. In the single motor EV mode, both the clutch CL1 and the brake BK1 are disengaged. Since the brake BK1 is disengaged, the rotation of the first sun gear 61 is allowed, and since the clutch CL1 is disengaged, differential motion of the first planetary gear mechanism 60 is allowed. The HV_ECU 50 allows the second rotary machine MG2 to output positive torque through the MG_ECU 51 and allows the vehicle 100 to generate driving force in a forward movement direction. The HV_ECU 50 allows the first rotary machine MG1 to operate as a generator to decrease a drag loss. Specifically, the HV_ECU 50 applies slight torque to the first rotary machine MG1 to generate electric power and sets a rotational speed of the first rotary machine MG1 to 0. According to this, the drag loss of the first rotary machine MG1 may be decreased. It may also be configured that the MG1 torque is not applied when it is possible to maintain the MG1 rotational speed at 0 by using cogging torque even when the MG1 torque is set to 0. Alternatively, the MG1 rotational speed may be set to 0 by d-shaft lock of the first rotary machine MG1.

The first ring gear 63 is dragged by the second carrier 74 to positively rotate. Since the first planetary gear mechanism 60 is in a neutral state in which the clutch CL1 and the brake BK1 are disengaged, the engine 1 is not dragged and the first carrier 64 stops rotating. Therefore, a regeneration amount may be made large.

At the time of travel in the single motor EV mode, a case in which a battery is fully charged and regeneration energy cannot be taken might occur. In this case, engine braking might be used together. Engaging the clutch CL1 or the brake BK1 may connect the engine 1 to the drive wheel 82, thereby braking the drive wheel 82 with the engine. When the clutch CL1 or the brake BK1 is engaged in the single motor EV mode as indicated by the triangle mark in FIG. 9, it becomes possible to drag the engine 1 and speed up the engine by the first rotary machine MG1 to break with the engine.

Figure 11:
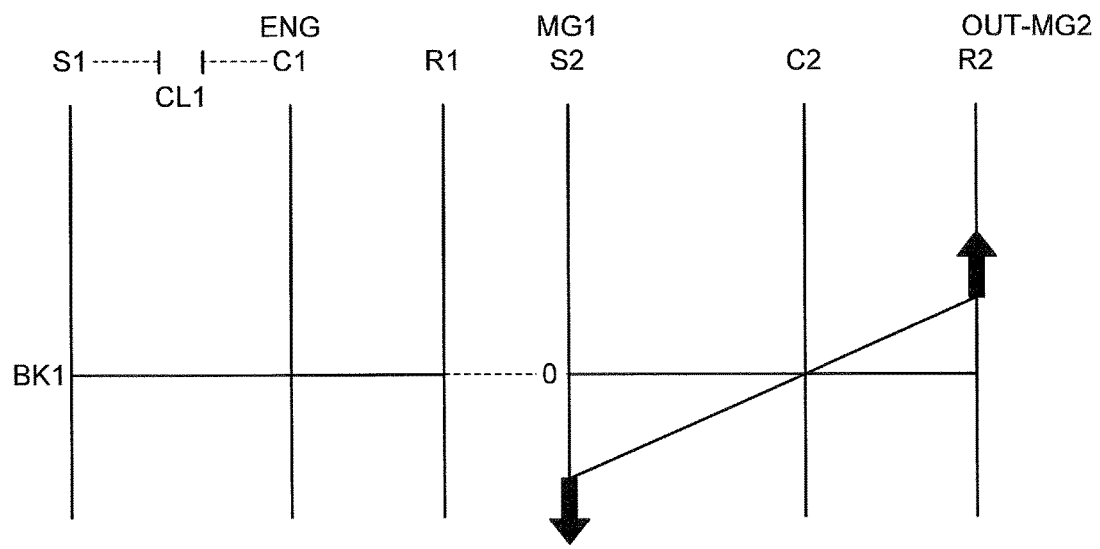
FIG. 11 is an alignment chart regarding a both motor EV mode.

In the both motor EV mode, the HV_ECU 50 engages the clutch CL1 and the brake BK1. FIG. 11 is an alignment chart regarding the both motor EV mode. Since the clutch CL1 is engaged, the differential motion of the first planetary gear mechanism 60 is regulated, and since the brake BK1 is engaged, the rotation of the first sun gear 61 is regulated. Therefore, all the rotary elements of the first planetary gear mechanism 60 stop rotating. Since the rotation of the first ring gear 63 being the output element is regulated, a rotational speed of the second carrier 74 connected thereto is locked at 0. The HV_ECU 50 allows the vehicle 100 to travel by allowing the first and second rotary machines MG1 and MG2 to output torque for travel driving.

Figure 12:
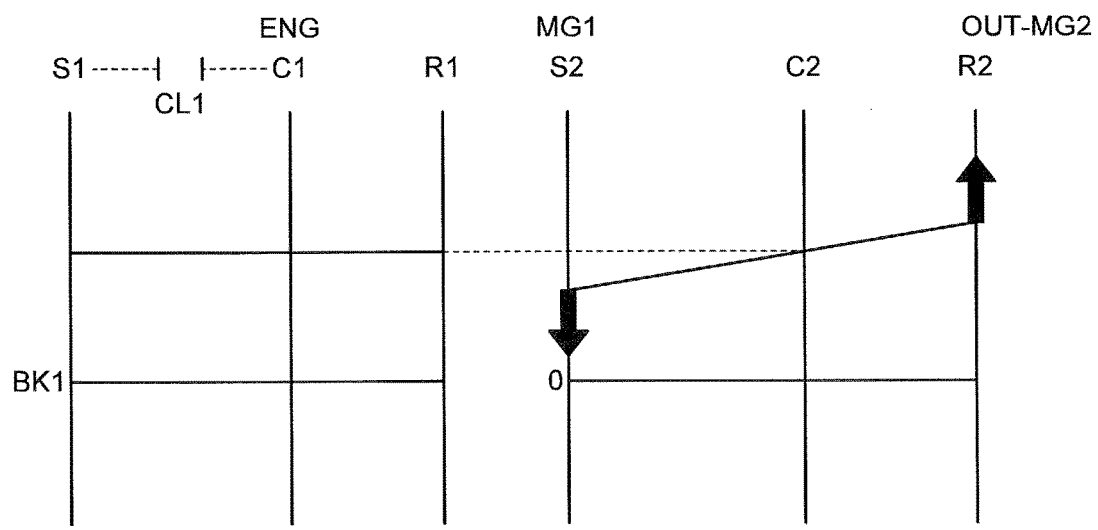
FIG. 12 is an alignment chart regarding a HV low mode.
Figure 13:
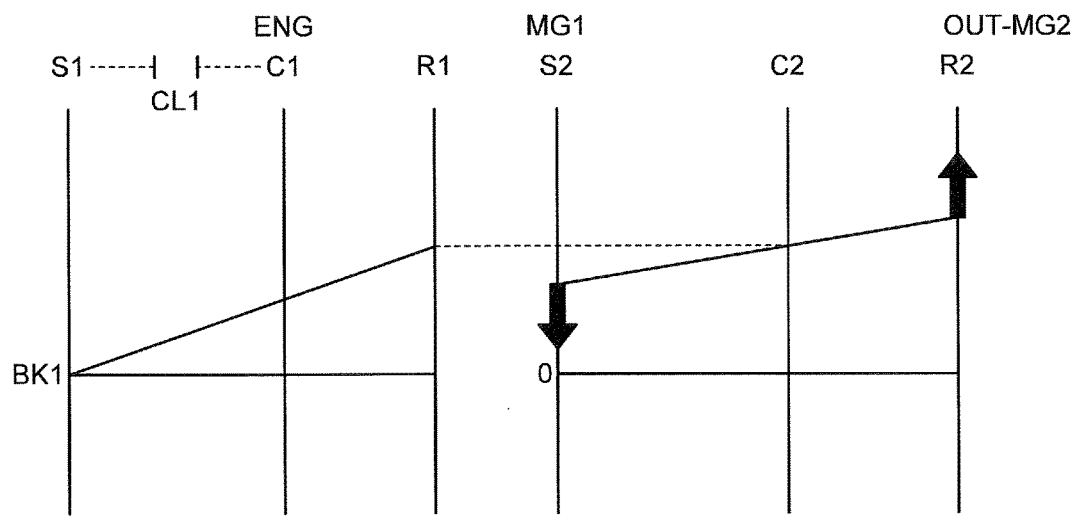
FIG. 13 is an alignment chart regarding a HV high mode.

In the HV travel, the second planetary gear mechanism 70 as the differential unit basically is in a differential state and the first planetary gear mechanism 60 of the transmission unit is switched between low and high. FIG. 12 is an alignment chart regarding a HV travel mode in a low state (hereinafter, also referred to as "HV low mode") and FIG. 13 is an alignment chart regarding a HV travel mode in a high state (hereinafter, also referred to as "HV high mode").

In the HV low mode, the HV_ECU 50 engages the clutch CL1 and disengages the brake BK1. Since the clutch CL1 is engaged, the differential motion of the first planetary gear mechanism 60 is regulated and the rotary elements 61, 63, and 64 integrally rotate with one another. Therefore, the rotation of the engine 1 is not accelerated or decelerated and is transmitted from the first ring gear 63 to the second carrier 74 at the same speed.

In contrast, in the HV high mode, the HV_ECU 50 disengages the clutch CL1 and engages the brake BK1. Since the brake BK1 is engaged, the rotation of the first sun gear 61 is regulated. Therefore, the first planetary gear mechanism 60 is put into an overdrive (OD) state in which the rotation of the engine 1 input to the first carrier 64 is accelerated to be output from the first ring gear 63. In this manner, the first planetary gear mechanism 60 may accelerate the rotation of the engine 1 to output. A gear ratio of the first planetary gear mechanism 60 at the time of overdrive may be set to 0.7, for example.

In this embodiment, since the rotation of the engine 1 is output after the speed thereof is changed by switch between the HV high mode and the HV low mode, there are two mechanical points and fuel consumption may be improved. Meanwhile, the mechanical point is a highly efficient operation point at which entire power input to the planetary gear mechanisms 60 and 70 is transmitted to the counter drive gear 75 by mechanical transmission without intervention of an electric path.

In the power transmission device 1-2 according to this embodiment, the first planetary gear mechanism 60 may accelerate the rotation of the engine 1 to output from the first ring gear 63. Therefore, the power transmission device 1-2 has one more mechanical point on a high-gear side of the mechanical point of a case in which the engine 1 is directly connected to the second carrier 74 without the first planetary gear mechanism 60 provided. That is to say, the power transmission device 1-2 has two mechanical points on the high-gear side. Therefore, the power transmission device 1-2 may realize a hybrid system capable of improving the fuel consumption by improving transmission efficiency at the time of high-speed travel.

(Rearward Travel)

At the time of rearward travel, the first rotary machine MG1 generates electric power as the generator and the second rotary machine MG2 performs power running as a motor and negatively rotates to output negative torque to travel during the engine travel. When the battery is sufficiently charged, it is also possible that only the second rotary machine MG2 negatively rotates to perform motor travel in the single motor EV mode. It is also possible to travel rearward in the both motor EV mode by fixing the second carrier 74.

(Cooperative Gear Shift Control)

The vehicle 100 according to this embodiment may simultaneously shift gears of the differential unit (second planetary gear mechanism 70) at the time of gear shift of the transmission unit (first planetary gear mechanism 60) to allow the same to serve as an electric continuously variable transmission as a whole. The gears of the differential unit may be shifted by change in the rotational speed of the first rotary machine MG1. A gear ratio of the differential unit may be continuously changed by control of the rotational speed of the first rotary machine MG1.

As illustrated in FIG. 8, a first drive gear 17 is connected to the first carrier 64 through the first one-way clutch F1. The first drive gear 17 meshes with a first gear 18 provided on a rotary shaft 20a of the oil pump 20. Configurations of the first one-way clutch F1, the second one-way clutch F2, the first drive gear 17, a second drive gear 21, the first gear 18, a second gear 19, the oil pump 20, the pump drive motor 22 and the like may be made the same as those of the above-described first embodiment. The hydraulic control device 25 adjusts hydraulic pressure of oil transmitted from the oil pump 20 to supply to the clutch CL1 and the brake BK1. Pump control at the time of engine startup may be made similar to that of the above-described first embodiment.

Meanwhile, the power train configuration is not limited to those illustrated in the above-described first and second embodiments. For example, the power transmission device provided with the engine, the motor, and the pump connected to each of the rotary shaft of the engine and the rotary shaft of the motor through the one-way clutch for rotating the motor at the rotational speed higher than the rotational speed corresponding to the speed of the engine and lower than the rotational speed corresponding to the idling speed of the engine may be mounted on a hybrid vehicle which is not that illustrated and a vehicle other than the hybrid vehicle.

[First Variation of Embodiments]

A first variation of the above-described first and second embodiments is described. Control of the above-described embodiments, that is to say, pump control to rotate a pump drive motor 22 at a rotational speed higher than the rotational speed corresponding to an engine speed Ne and lower than the rotational speed corresponding to an idling speed of the engine 1 at the time of engine 1 startup may be executed when the engine 1 is cold. For example, it is also possible to configure that the above-described pump control at the time of the engine startup is executed when cooling water temperature of the engine 1 is equal to or lower than predetermined temperature determined in advance, and the above-described pump control at the time of the engine startup is not executed when the cooling water temperature is higher than the predetermined temperature. In this manner, it is possible to rotary-drive an oil pump 20 by the pump drive motor 22 when strong resonance of the engine 1 might occur, thereby inhibiting fluctuation in pump rotational speed Np by the resonance.

[Second Variation of Embodiments]

A predetermined rotational speed N2 of an oil pump 20 may be made variable according to temperature (ambient temperature, cooling water temperature, ATF temperature and the like). For example, when an engine 1 is cold, a rotational speed of a pump drive motor 22 (target motor rotational speed Nmt) when the pump drive motor 22 is rotated at the time of engine 1 startup is preferably higher than that when the engine 1 is hot. It is possible to improve an effect of inhibiting hydraulic pressure oscillation by increasing a pump rotational speed Np in a cold time in which strong resonance of the engine 1 easily occurs and time required for getting out of a resonance generation range is long. It is possible to decrease a loss in the pump drive motor 22 and the oil pump 20 by maintaining the pump rotational speed Np low in a normal temperature range in which the resonance at the time of the engine startup is relatively weak. Meanwhile, the predetermined rotational speed N2 when temperature of oil supplied to the oil pump 20 is low may be set to be higher than the predetermined rotational speed N2 when the temperature of the oil is high.

[Reference Example]

Figure 14:
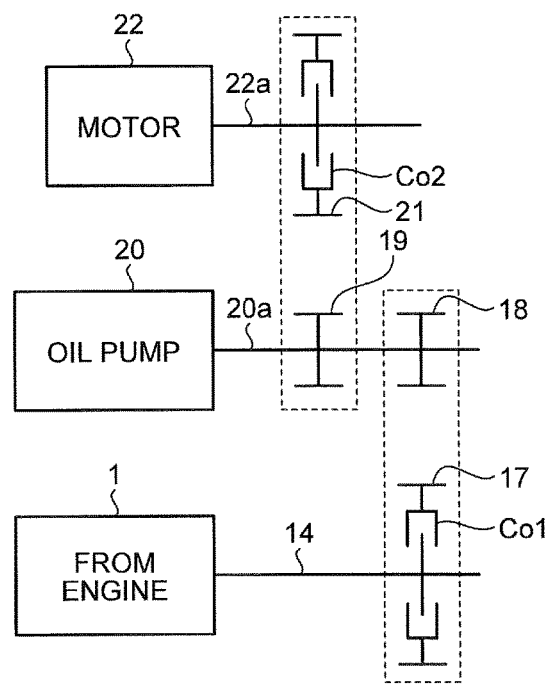
FIG. 14 is a schematic configuration diagram regarding an oil pump of a reference example.

A reference example is described. A clutch device capable of switching between engagement and disengagement by control may be used in place of first and second one way clutches F1 and F2. For example, a wet frictional engaging clutch device which is engaged or disengaged by hydraulic pressure may be used in place of the one way clutches F1 and F2. FIG. 14 is a schematic configuration diagram regarding an oil pump of the reference example. FIG. 14 illustrates a configuration in which the first one-way clutch F1 is replaced with a first clutch Co1 and the second one-way clutch F2 is replaced with a second clutch Co2 in a vehicle 100 in the above-described first embodiment.

The first clutch Co1 connects or disconnects a first carrier 14 to or from a first drive gear 17. The first clutch Co1 being a normally open clutch device is disengaged by energizing force of an energizing member such as a spring. The first clutch Co1 is engaged against the energizing force of the energizing member by supplied hydraulic pressure.

The second clutch Co2 connects or disconnects a rotary shaft 22a of a pump drive motor 22 to or from a second drive gear 21. The second clutch Co2 being a normally closed clutch device is engaged by the energizing force of the energizing member such as the spring. The second clutch Co2 is disengaged against the energizing force of the energizing member by the supplied hydraulic pressure.

At the time of engine startup, the first clutch Co1 is disengaged, the second clutch Co2 is engaged, and an oil pump 20 is driven by the pump drive motor 22. When an engine speed Ne increases up to a finishing speed Net at the time of the engine startup, the first clutch Co1 is engaged and the second clutch Co2 is disengaged.

The following power transmission device is disclosed in the above-described embodiments and variations.

"A power transmission device configured to drive a common oil pump by an engine and another driving force source through clutching means, the power transmission device which maintains a rotational speed of the oil pump by another driving force source at the rotational speed above a startup time resonance generation range of the engine during engine startup."

Although the planetary gear mechanisms 10, 60, and 70 are the single pinion type planetary gear mechanisms in the above-described embodiments and variations, the mechanism is not limited thereto and may also be a double pinion type, for example. The configuration of the transmission unit is not limited to that illustrated. For example, although the transmission unit 30 of the above-described first embodiment includes the four-speed gear stages, the number of gear stages is arbitrary. The transmission unit 30 is not limited to a stepped transmission. The connection of the clutch CL1 and the brake BK1 which shift the gears of the transmission unit (first planetary gear mechanism 60) of the above-described second embodiment to each rotary elements of the first planetary gear mechanism 60 is not limited to that illustrated.

The contents disclosed in the above-described embodiments and variations may be appropriately combined to be executed.

REFERENCE SIGNS LIST 1-1, 1-2 POWER TRANSMISSION DEVICE
1 ENGINE
1a ROTARY SHAFT
20 OIL PUMP
20a ROTARY SHAFT
22 PUMP DRIVE MOTOR (ROTARY MACHINE)
F1 FIRST ONE-WAY CLUTCH
F2 SECOND ONE-WAY CLUTCH
Nmt TARGET MOTOR ROTATIONAL SPEED

The invention claimed is:

1. A power transmission device comprising:
an engine;
a rotary machine; and
an oil pump connected to a rotary shaft of the engine through a first one-way clutch, and the oil pump being connected to a rotary shaft of the rotary machine through a second one-way clutch, wherein:
operation of the rotary machine is started after a time of determining that an engine startup is required and before an engine startup instruction is issued in response to determining that the engine startup is required,
the rotary machine is configured to rotate at: (i) a higher rotational speed than a corresponding rotational speed of the engine in a resonance generation range, and (ii) a lower rotational speed than a corresponding idling speed of the engine at the time of startup of the engine.

2. The power transmission device according to claim 1, wherein the rotary machine is configured to rotate for a predetermined period from a start of the startup of the engine at the time of the startup of the engine.

3. The power transmission device according to claim 1, wherein the rotational speed of the rotary machine is determined based on a temperature of the engine.

4. The power transmission device according to claim 1, wherein the rotational speed of the rotary machine at the time of the startup of the engine is a lower rotational speed than the corresponding idling speed of the engine at the time of startup of the engine.

5. The power transmission device according to claim 1, wherein the rotary machine is an oil pump motor.

* * * * *